(12) United States Patent
Rosenbaum (10) Patent No.: US 7,422,147 B2
(45) Date of Patent: Sep. 9, 2008

(54) SYSTEM AND METHOD FOR DETECTING FRAUDULENT TRANSACTIONS OF ITEMS HAVING ITEM-IDENTIFYING INDICIA

(76) Inventor: Walter Steven Rosenbaum, 3 rue Eugene Labiche, Paris (FR) 75116

( * ) Notice: Subject to any disclaimer, the term of this patent is extended or adjusted under 35 U.S.C. 154(b) by 0 days.

(21) Appl. No.: 11/615,003

(22) Filed: Dec. 22, 2006

(65) Prior Publication Data
US 2008/0149725 A1 Jun. 26, 2008

(51) Int. Cl.
G06K 15/00 (2006.01)
(52) U.S. Cl. .................. 235/383; 235/385; 235/435; 705/16; 705/27; 382/141; 382/143
(58) Field of Classification Search .............. 235/385, 235/383, 435
See application file for complete search history.

(56) References Cited

U.S. PATENT DOCUMENTS

| | | | | |
|---|---|---|---|---|
| 5,609,223 | A * | 3/1997 | Iizaka et al. ................. | 186/61 |
| 6,069,696 | A * | 5/2000 | McQueen et al. ............ | 356/326 |
| 6,363,366 | B1 * | 3/2002 | Henty .......................... | 705/400 |
| 7,118,206 | B1 * | 10/2006 | Stockwell et al. ............ | 347/92 |
| 7,133,740 | B1 * | 11/2006 | Stenson et al. .............. | 700/215 |
| 2002/0138374 | A1 * | 9/2002 | Jennings et al. ............ | 705/29 |
| 2004/0065740 | A1 * | 4/2004 | Mergenthaler et al. . | 235/462.14 |
| 2004/0218815 | A1 * | 11/2004 | Iizuka ......................... | 382/209 |
| 2004/0223663 | A1 * | 11/2004 | Cato ............................. | 382/318 |
| 2005/0103840 | A1 * | 5/2005 | Boles ........................... | 235/385 |

FOREIGN PATENT DOCUMENTS

FR 2863082 A1 6/2005

OTHER PUBLICATIONS

Derrode, Stephane and Ghorbel, Faouzi, "Robust and efficient Fourier-Mellin transform approximations for gray-level image reconstruction and complete invariant description," Computer Vision and Image Understanding: CVIU, vol. 83, 2001, pp. 57-78 (reprinted as pp. 1-23).
Palmer, Roger C., "The Bar Code Book," Second Edition, Helmers Publishing, Inc., Peterborough, New Hampshire, 1991, ISBN 0-1911261-05-2, Chapter 6-Reading Equipment, pp. 69-108.

* cited by examiner

Primary Examiner—Michael G. Lee
Assistant Examiner—Ali Sharifzada
(74) Attorney, Agent, or Firm—Jerry Turner Sewell (57) ABSTRACT

A method of detecting a fraudulent transaction of an item having an item-identifying indicium processes the indicium to obtain item-identifying information, and captures a digital representation of a surface area of the item. The item-identifying information is used to retrieve a stored digital representation of the surface area of the item. Further, the method compares the captured digital representation with the stored digital representation to determine if the captured digital representation corresponds to the stored digital representation.

17 Claims, 7 Drawing Sheets

SYSTEM AND METHOD FOR DETECTING FRAUDULENT TRANSACTIONS OF ITEMS HAVING ITEM-IDENTIFYING INDICIA

BACKGROUND OF THE INVENTION

The various embodiments described herein generally relate to processing an item-identifying indicium on an item. More particularly, the various embodiments described herein relate to a system and method for detecting fraudulent item transactions.

The packaging of essentially every product on the market is provided with some sort of machine-readable indicium. Such an indicium may be a bar code, a (non-bar) pattern code, a magnetic strip, a radio frequency identity tag (RFID tag), or non-visible identification signs. Examples of a bar code are the Universal Product Code (UPC), or the European Article Number (EAN), typically printed on the product packaging. For example, in retail and grocery stores, a ubiquitous part of the checkout process is a cashier scanning of bar codes on purchased items. Instead of the cashier having to read a price and enter it manually into a cash register, the operation of ringing up a sale and entering its price is done with one swift cashier hand movement that runs the face of the item containing a bar code past a bar code scanner or a hand-held bar code scanner being positioned over the bar code. The known technique of scanning a bar code is described, for example, in Roger C. Palmer, The Bar Code Book, Helmers Publishing, Inc., Second Edition 1991, e.g., Chapter 6—Reading Equipment, pages 69-109.

The effectiveness of such a cashier bar code checkout is that the procedure requires no attention from the cashier other than the manual manipulation of merchandise from either a basket or short conveyor belt. Once the cashier grasps an item, the face of the item having the UPC, or other bar code, is oriented away from the cashier's field of vision and positioned over a glass port and sensors trigger the bar code scanning operation. An audio tone normally advises the cashier that the bar code on the item has been read and the transaction registered. Safety concerns and ergonomics require that the bar code be facing away from the cashier while scanning, and, hence, the operator's attention is detached from the scanning process.

The cashier typically is not expected to scrutinize the bar code before scanning, but rather after a cursory examination of the item being rung up, positions the bar coded side of the packaging to face the bar code scanning window of the check-out station, or a hand-held bar code reader. This cashier process of UPC bar code scanning, while being much faster and accurate than cashier keyboard entry, creates a very open and unprotected area for bar code fraud.

In fact, bar code fraud at retail and grocery checkout counters has reached the proportions in the hundreds of millions of dollars, as reported in the European Wall Street Journal on Oct. 26, 2006, pages 14-15. According to that report, large scale organized fraud as well as individual shoplifting is being done via printing bar codes of low cost items and non-obtrusively pasting them over the genuine manufacture code. Hence, an expensive item can be transited "normally" through the checkout cashier, but being charged the perpetrator at a fraction of listed price.

It is not reasonable to expect that checkout cashiers perform a sanity check on each specific item's price being rung-up, or even the final bill, especially during busy periods or if they are relatively new to the job. This is the basic premise of document FR 2863082, entitled "Visual control device used at checkout of consumer goods." That visual control device is configured so that a scanned bar code on the item, which the cashier is currently handling, brings up on a cashier display screen an image of the item that should correspond to that bar code. This product image displayed to the cashier allows the cashier to double check if the scanned product is the same as the one displayed. However, with its distraction and attendant difficulties of making the cognition and comparison between the bar code scanned item and the displayed image, the very productivity that underlies the economics of bar code scanning in retail and grocery operations greatly diminishes.

SUMMARY OF THE INVENTION

Therefore, a need exists for an improved system and method for detecting fraudulent item transactions.

Accordingly, one aspect involves a method of detecting a fraudulent transaction of an item having an item-identifying indicium. The method processes the indicium to obtain item-identifying information, and captures a digital representation of a surface area of the item. The item-identifying information is used to retrieve a stored digital representation of the surface area of the item. Further, the method compares the captured digital representation with the stored digital representation to determine if the captured digital representation corresponds to the stored digital representation.

A further aspect involves a system for detecting a fraudulent transaction of an item having an item-identifying indicium. The system includes a reader configured to process the indicium to obtain item-identifying information, and an imaging device configured to capture a digital representation of a surface area of the item. The system includes further a processor coupled to the reader, the imaging device and a memory device, wherein the processor is configured to use the item-identifying information to retrieve a stored digital representation of the surface area of the item from a data base of the memory device, and to compare the captured digital representation with the stored digital representation to determine if the captured digital representation corresponds to the stored digital representation.

Another aspect involves a method of creating a data set for an item that is subject to fraud. The method processes the indicium to obtain item-identifying information, and captures a digital representation of a surface area of the item. The method associates the obtained item-identifying information with the captured digital representation of the item's surface area in an item data set, and stores the item data set in a data base.

According to one embodiment, the improved system and method are based on augmenting a bar code scanner with an adjacent digital image acquisition device that lifts an image of an item's packaging immediately adjacent to the bar code or other designated area of the item packaging. The bar code scanner, when it detects the bar code, triggers the image acquisition device. The obtained image of the bar code surrounding area is then compared with an image retrieved from a memory and corresponding to the scanned bar code of the item. If the images match, the item's bar code is genuine.

Advantageously, the improved system and method are configured to detect fraudulent or erroneous item transactions or fraudulent item indicia, such as bar codes on products without direct cashier or operator intervention that may disturb the efficiency of check-out bar code scanning or requires additional training or orientation. For example, the improved system and method can be implemented seamlessly with the bar code reading process, without changing the current operator time/motion of scanning and bagging. The described detection of fraudulent item transaction, or item indicium detection, do not require additional cashier handling and can be implemented, for example, in stationary bar code reading stations, such as grocery checkout counters, and hand-held bar code readers.

Furthermore, the improved system and method described herein automatically signal and advise of any problem detected, without interfering with the expected throughput at the cashier checkout counter, and allow automatic notification of security with adequate information to effectively intercede and immediately re-identify the item at issue.

Advantageously, the improved system and method described herein are applicable to a variety of indicia (e.g., magnetic stripes or RFID tags) found on a plurality of items.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
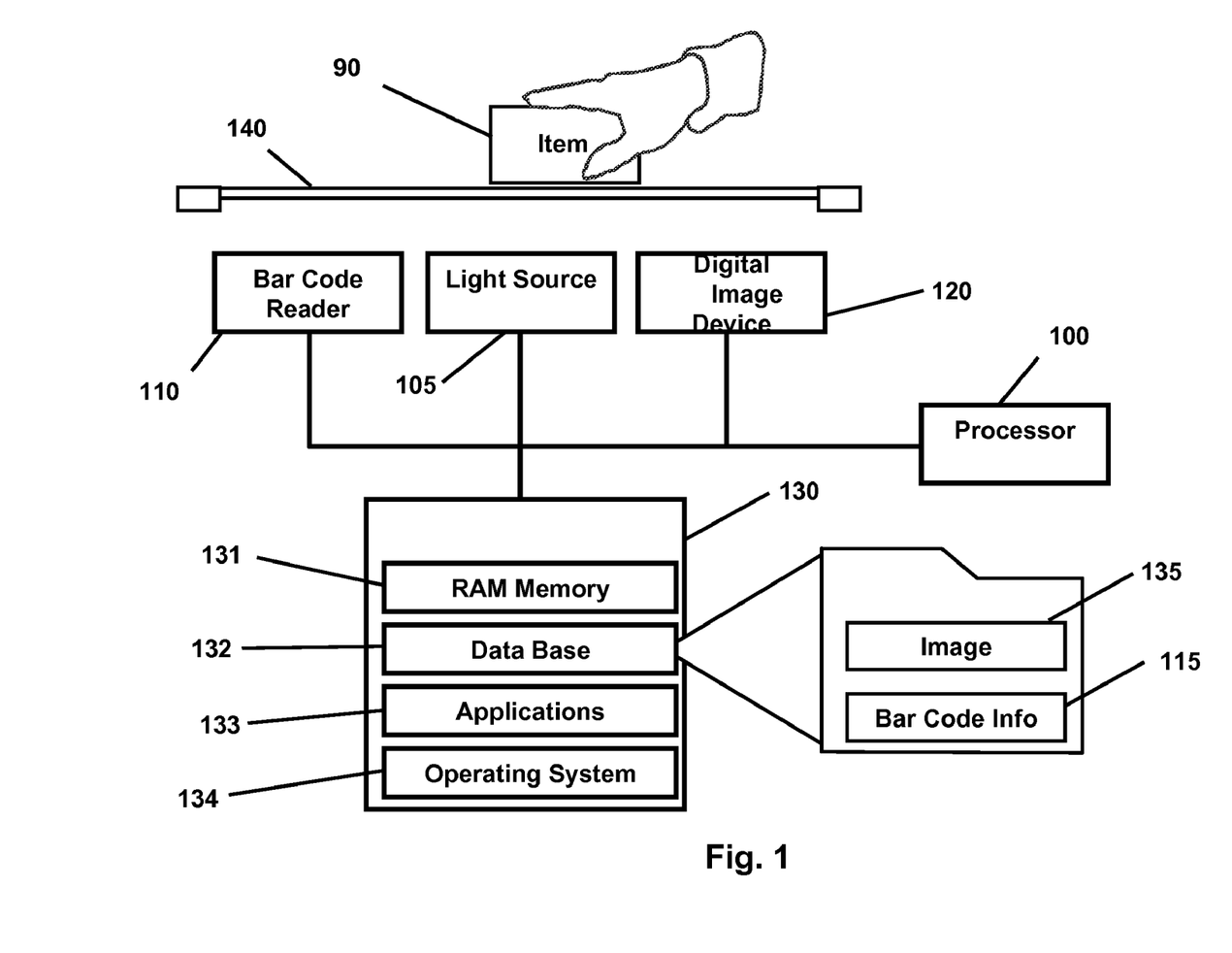
FIG. 1 shows a schematic block diagram of one embodiment of a system for detecting a fraudulent item transaction.

FIG. 1 illustrates an overview of a first embodiment of a system for detecting a fraudulent item transaction or an altering of an item's indicium. In one embodiment, the system is implemented in a cashier system installed in a grocery or retail store to read a bar code and to use the bar code reading to ring up the price of the item. As bar code processing in a store application is currently believed to be an important field of use, the various other embodiments are, therefore, described with reference to a cashier system of a grocery or retail store. However, it is contemplated that the system may be implemented in any system where an item's indicium is processed by a machine and the item is subject to fraud. Therefore, it is contemplated that the various embodiments are not limited to cashier systems of grocery or retail stores.

For example, the system may be implemented with respect to access systems, such as in companies or other restricted areas, where security cards are issued to authorized persons and include the persons' photographs (e.g., employee badges), or library or credit cards, also with photographs of authorized users. For a given company or library, the issued cards generally look all the same so that looking for general differences, such as color or patterns will not be sufficient.

In security or credit card fraud, a genuine (but stolen) card is believed to be manipulated by pasting the perpetrator's photograph over the photograph of the true owner to fool security guards. Since an electronic security system only scans the bar code or magnetic strip, and a security guard only compares the "live" face with the photograph on the security card, similar to retail store bar code fraud, the manipulation is only discoverable at close inspection. Even at close inspection it may not be discoverable at all because the perpetrator has much more time than a shop lifter to produce an elaborate fake security card.

In these applications, the system and method described use a digital representation obtained from a surface area of the item that is the most distinguishing area of otherwise very similar items. This area has the highest identification value. For example, with security cards, library cards or credit cards with photographs, the area containing a photograph of the authorized user has the highest identification value. As described herein, item packaging and surface are used in an inclusive manner to include all the above surfaces that can be digitally imaged during the indicium based transaction. Further, it is contemplated that a bar code (UPC or EAN) is one example of an indicium. The term bar code as used throughout this description is intended to cover generically all bar code encoding formats or optical methods of capturing and recognizing the numeric equivalency of the bar code that is frequently printed adjacent to the bar code, such as a numeric string. As known in the art, a bar code typically encodes a number referencing an entry in a database. A bar code may also encode a variety of product information directly or by inference to a database. It is contemplated that other indicia, such as magnetic stripes, RFID tags, pattern codes, two-dimensional bar codes or non-visible identification signs, may be used as well.

As shown in FIG. 1, an operator moves an item across an upper side of a transparent cover surface 140. A bar code reader 110, a digital image acquisition device 120 and a light source 105 are positioned on an opposite side of the transparent cover surface 140, and coupled to a processor 100 and a memory device 130. In one embodiment, the processor 100 is directly connected to the bar code reader 110, the digital image acquisition device 120, the light source 105 and the memory device 130. The memory device 130 contains an operating system 134, application software 133 to perform the method described herein, a RAM memory 131 where the method is performed and a data base 132. The data base 132 stores image data 135 and bar code information 115, as described below in more detail.

It is contemplated that FIG. 1 is not to be interpreted to exclude storage of one or more of the elements 131-134 in locations other than a single memory unit, but to extend to cases where the function of RAM memory 131, data base 132, application software and operating system 134 is distributed over several storage media across the system. Likewise, it is contemplated that the processor 100 and the memory device 130 may be located away from the bar code reader 110, the light source 105 and the digital image acquisition device 120, for example, in a control room of a grocery store as part of a larger computer system that serves several cashier systems, or at the store's remote headquarters. Accordingly, data transfer may occur over local or wide area computer networks, or the Internet.

The data base 132 is configured so that for each item a data set exists that contains in associated form the bar code information 115, or any representation thereof, delivered by the bar code reader 110 and the digital image 135, or any representation thereof. However, it is contemplated that the bar code information and the digital image of the package surface are stored either together in an item data set, as described, or in any other associated way and form in the data base 132 so that retrieval of one of those elements automatically yields the associated element.

Figure 7:
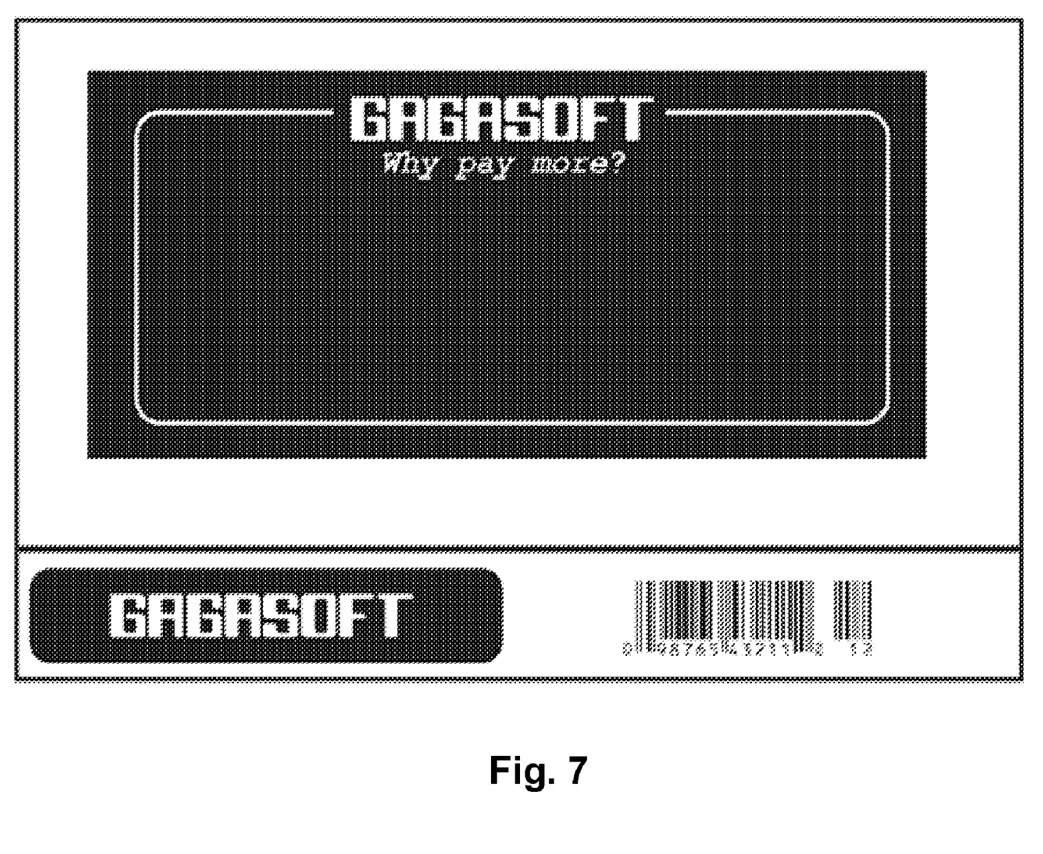
FIG. 7 is an exemplary surface area of an item having a bar code.

In one embodiment, the digital image 135 is taken of the packaging surrounding an immediate area of the printed bar code coordinated to be imaged as the bar code is scanned, for example, of an area illustrated in FIG. 7. In another embodiment, the digital image 135 is taken from another area of the respective packaging. Further, an image of the entire packaging may be stored, and the digital image 135 is of a random area of the packaging. This makes it impossible, or at least substantially more difficult, for a defrauder to anticipate what area of the packaging will be imaged, and to paste it over along with the bar code.

In one embodiment, the content of the data base 132 is supplied by vendors along with the UPC registration of the supplied items and their bar codes. For example, each vendor supplies for each item a data record containing bar code information and a digital image of specified area of the item's packaging. The data record is transferred to the data base 132 of the retailer's system.

In another embodiment, the content of the data base 132 is acquired after the respective merchandise is received by the wholesaler or retailer. For example, the wholesaler or retailer can gather an image snippet of each item and associate it with the item's bar code before shipping or shelving, and enter the image snippet and the associated bar code information into the data base 132, for example, via a procedure described below with reference to FIG. 1 where essentially the checkout scanning station or a handheld bar code reader are used for the coordinated bar code and image lift.

Regardless of how the content of the data base 132 is acquired, for each item its bar code information is ultimately associated with a defined digital image of the item's packaging. Hence, knowing an item's bar code the associated digital image can be determined from the data base 132. As applied in the embodiments described herein, the determined digital image can then be compared with a currently taken image of the item to determine whether or not the two images match. Should the images not match, the currently scanned item 90 is detected as fraudulent.

The bar code reader 110 may be based on one of several known bar code reading technologies, such as pen type readers, laser scanners, CCD (Charge Coupled Device) readers, or camera based readers. Briefly, a laser scanner decodes a waveform generated by a photodiode when the laser scanner moves over the bar code. Dark bars absorb light and white spaces reflect light so that the voltage waveform generated by the photo diode is an exact duplicate of the bar and space pattern in the bar code. CCD readers use a sensor array, wherein the sensor generates a voltage pattern identical to the pattern in a bar code. Camera based readers use a small video camera to capture an image of a bar code, and digital image processing techniques to decode the bar code. Further details regarding bar code technology are disclosed in The Bar Code Book, cited above.

Figure 2:
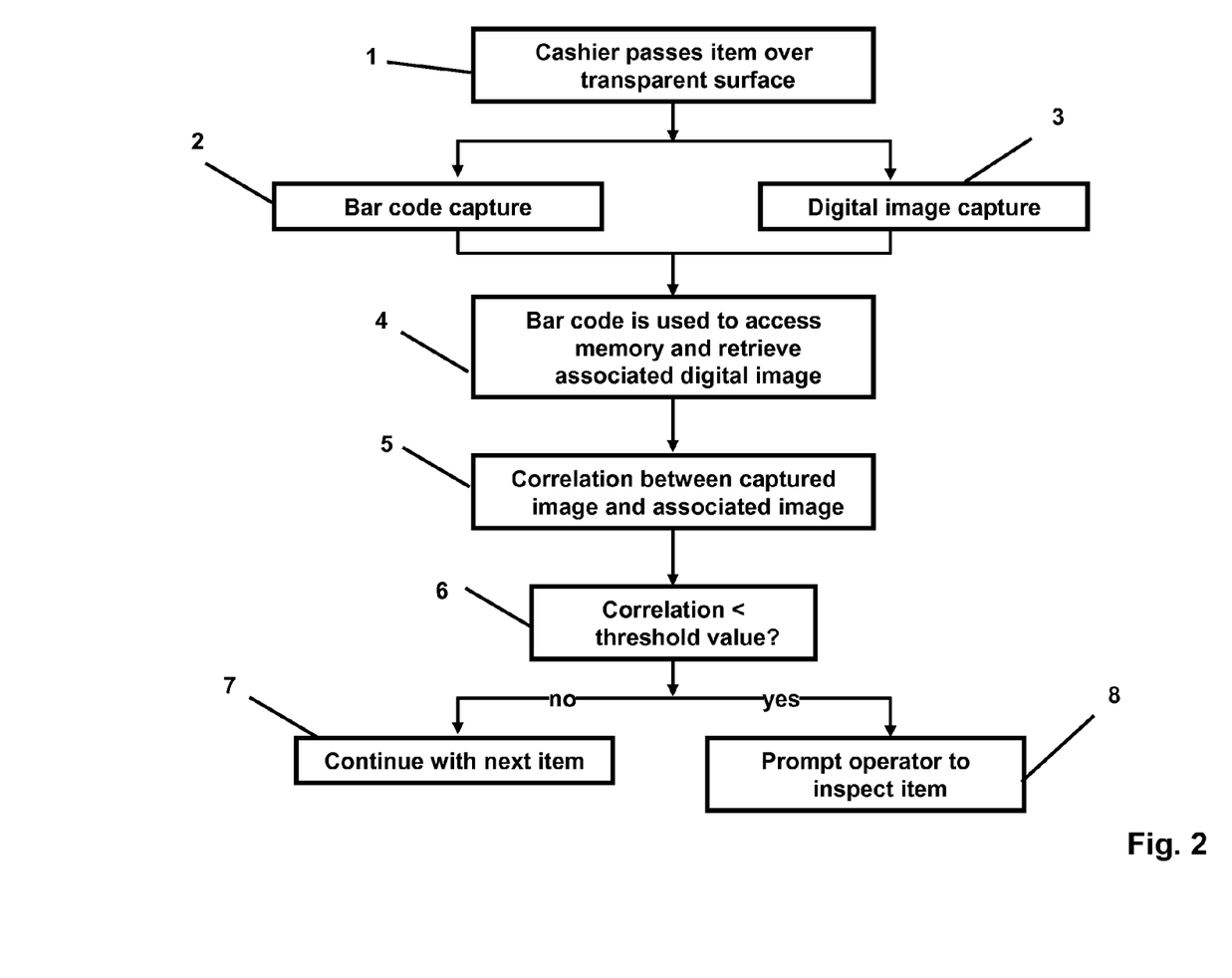
FIG. 2 is a flow diagram of one embodiment of a method of detecting a fraudulent item transaction.

FIG. 2 is a flow diagram of one embodiment of a method of detecting a fraudulent item transaction, e.g., by altering of an item's indicium. In a step 1, the cashier moves an item 90 across the transparent cover surface 140 so that the item's bar code faces the transparent cover surface 140. The light source 105 illuminates the item 90 from below through the transparent cover surface 140.

In a step 2, the method captures the item's bar code to obtain the item's bar code information. Regardless of the type of bar code reading technology is used, the bar code reader 110 decodes the number referencing a data base entry.

In a step 3, the method captures a digital image 125 of the item's packaging. That is, the digital acquisition device 120 is activated to scan the item's surface, or only a selected area thereof, and to generate a digital image of that surface. In one embodiment, activation of the digital acquisition device 120 is done by the bar code reader 110.

In FIG. 2, steps 2 and 3 are shown as parallel steps to illustrate that the bar code and the digital image 125 are in one embodiment captured nearly at the same time. However, in an illustration of another embodiment, steps 2 and 3 may be shown as sequential steps, wherein one of the steps is performed before the other, for example, step 2 before step 3. It is contemplated that the sequence of steps 2 and 3 is not critical.

Proceeding to a step 4, the method uses the obtained bar code information to access the data base 132 and to retrieve the digital image 135 assigned to the obtained bar code information. As described above, the data base 132 includes for each item the bar code information and its associated digital image 135.

Proceeding to a step 5, the method now has two images available, the retrieved associated image 135, and the captured image 125 of the currently processed item 90, and can perform a correlation between the two images 125, 135. That is, the method performs a fast pattern match between the captured image 125 and the (pre-stored) associated image 135 using algorithms, such as the Fourier-Mellin cross-correlation, that are independent of the orientations of the images.

Fourier-Mellin transformations are known, for example, from the section "Robust and Efficient Fourier-Mellin Transform Approximations for Gray-Level Image Reconstruction and Complete Invariant Description" in "Computer Vision and Image Understanding: CVIU", volume 83, 2001, pages 57-78, which is herewith incorporated by reference.

The various embodiments are not limited to using the Fourier-Mellin transformation to detect a discrepancy between the respective packaging of the checkout scanned item and the pre-stored snippet. However, the Fourier-Mellin technique is mentioned as a representative and well known example of the cross-correlation techniques that are orientation invariant, can utilize color or grey level, and are computationally readily achieved in real time.

In the broadest sense of the word cross-correlation can involve information obtained by optical character recognition (OCR) from the packaging (e.g., by recognizing text on the packaging), a census of color and intensity, bar code size or even spatial information where the bar code is positioned relative to other aspects of the package to name a few of the potential cross-correlation logics in addition to the more rigorous mathematical formulations such as Fourier-Mellin transformation.

One aspect upon which the described embodiments are based is the use and identification of packaging imagery beyond the bar code to affect validation with corresponding pre-stored representations of the packaging. This implies in it broadest sense that the bar code is augmented by confirming that identity of the item scanned by searching for attributes in the packaging that match characteristics stored in the data base 132. These characteristics can be a complete image snippet or other attributes like color patterns or even the location of the bar code relative to a character string. The Fourier-Mellin cross-correlation does this analytically versus one of many more empirical attribute matching approaches as briefly alluded to above.

In a step 6, the method determines if the cross-correlation value is lower than a predetermined threshold value. The cross-correlation value is a normalized number between 0 and 1. The threshold value can be determined empirically. In one embodiment, the threshold value is selected to be in a range between 0.8 and 0.9.

If the cross-correlation value is lower than the threshold value, the method proceeds along the YES branch to a step 8, and immediately flags a discrepancy and stops the transaction with a notification to the cashier or security, or both. In one embodiment, the operator is notified to inspect the item. In another embodiment, the method may alarm security personnel to inspect the items to avoid interruption at the cashier.

The notification can be by at least one of audio, visual and silent vibration signal and, if desired, accompanied by product identification information that, for example, can include the bar code scanned, a picture of the packaging surrounding the bar code or other area of packaging useful by its color or inscription to re-identify the item, a time stamp and other process and price related information. For example, this allows security personnel to better identify the item in a customer's bag or shopping cart, which may include several other purchased items.

If, however, the cross-correlation value is not lower than the threshold value, the method proceeds along the NO branch to a step 7. As no irregularity has been detected, the item can be bagged and the operator can continue scanning the next item.

Figure 3:
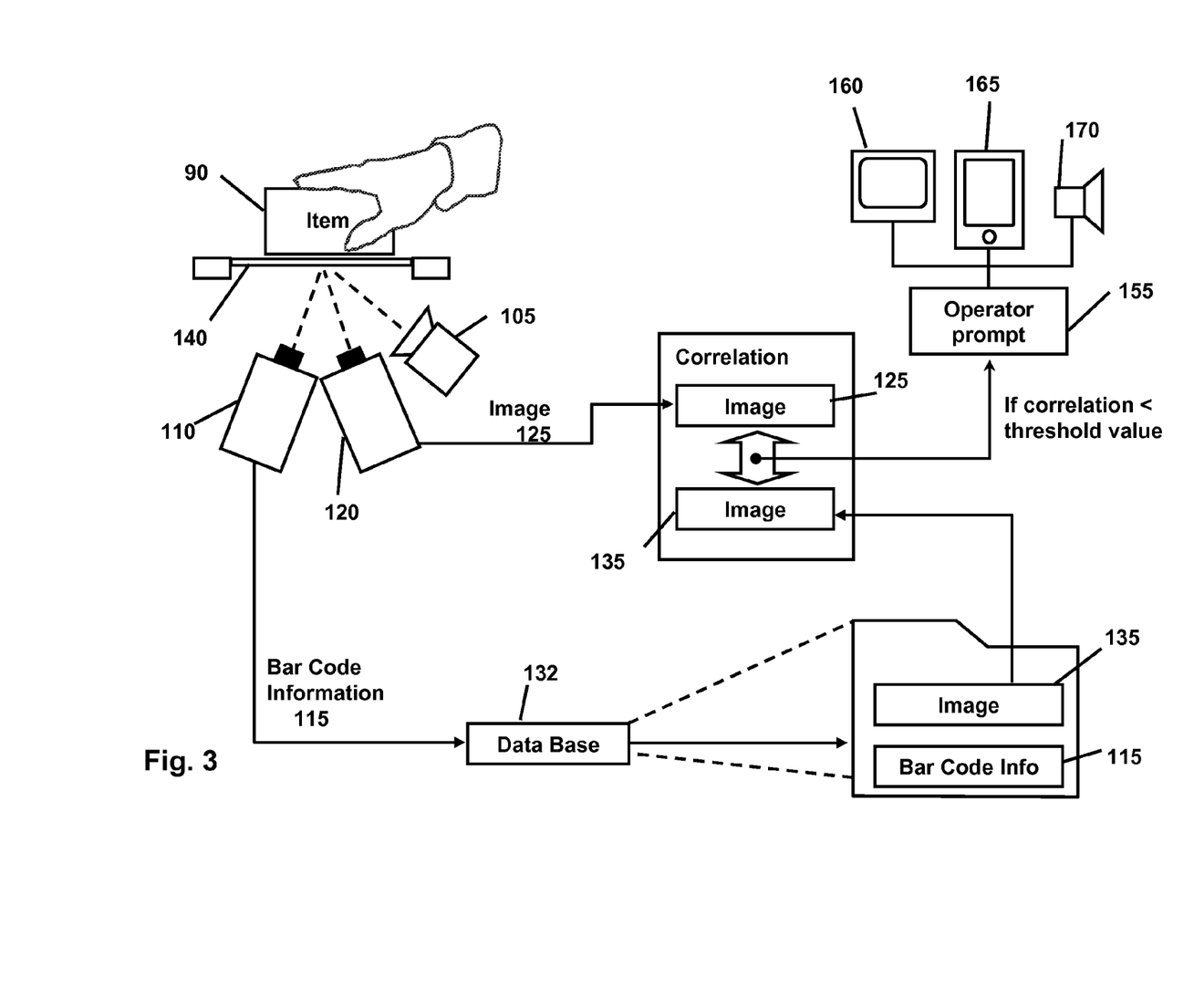
FIG. 3 is a more detailed illustration of the system of FIG. 1 in accordance with a first embodiment.
Figure 4:
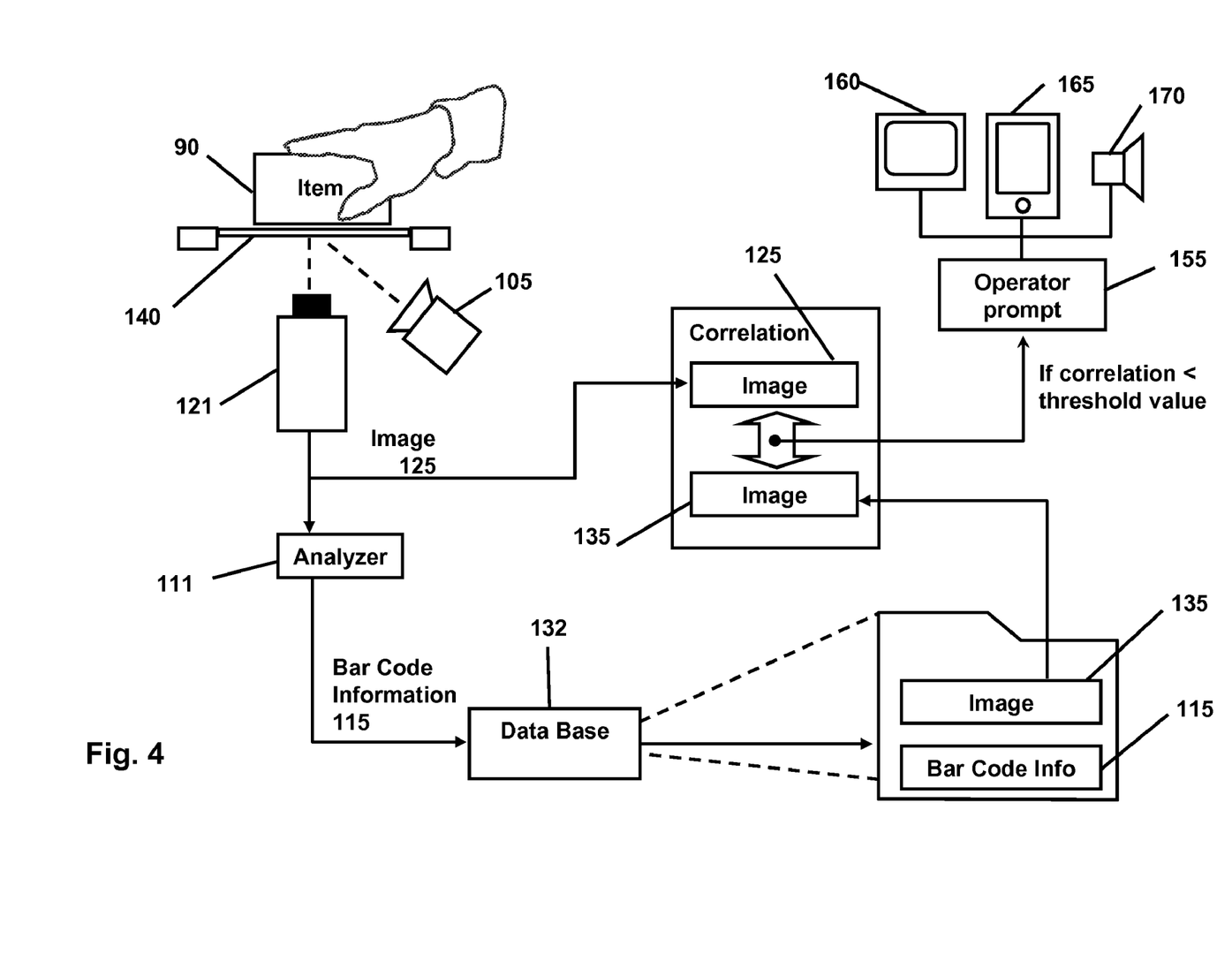
FIG. 4 is a more detailed illustration of the system of FIG. 1 in accordance with a second embodiment.

FIGS. 3 and 4 are detailed illustrations of the system of FIG. 1 in accordance with a first embodiment (FIG. 3) and a second embodiment (FIG. 4). The embodiments differ with respect to the way the digital image and the bar code information are obtained.

The embodiment of FIG. 3 includes a discrete bar code reader 110 and a digital image acquisition device 120, which are positioned, for example, so that both the bar code scanner 110 and the digital image acquisition device 120 get a coordinated view of the bar code and the surrounding packaging of the item 90.

The light source 125 is positioned to illuminate the area of packaging that the digital image acquisition device 120 is focused upon with sufficient intensity to generate a usable digital image. The light source 125 can be positioned, for example, below the item 90 being scanned near the bar code reader 110 and the digital image acquisition device 120. The light source 125 can be angled away from the cashier so as to avoid disturbing the cashier or customer while providing illumination for the digital image acquisition.

The cashier passes the item 90, with the bar coded surface facing the transparent support surface 140 whereupon the bar code reader 110 senses and acquires the bar code information. In a coordinated manner, the digital image acquisition device 120 takes a digital image 125 of the specified portion of the packaging. This is most readily envisaged, but not restricted, to the packaging areas contiguous to the bar code.

Alternative embodiments may use other features of the acquired image for matching such as optical character recognition analysis of any text occurring on the image, color analysis or a comparison of the size and position of the barcode itself.

The processor 100 then takes the recognized bar code output from bar code reader 110 and via appropriate applications from applications 133 (see FIG. 1) uses it to access the data base 132 and retrieve the related digital image 135 of the snippet of packaging pre-stored with each bar code. The processor 100 then performs a correlation, such as Fourier-Mellin analysis between the currently obtained image 125 and the image 135 retrieved from the data base 132. If the correlation falls below the given threshold value, the operator is prompted via means 155 for generating an audio or visual prompt to examine the item packaging versus the bar code rung-up transaction.

Similarly, security can be notified or only notified if the correlation between the scanned image 125 and the pre-stored image 135 is below a clear no-match threshold value of, e.g., 150'. The notification of security can be done via a display 160, a PDA-like device 165 or an audio device 170.

In the embodiment of FIG. 4 optical bar code reading is performed by means of a digital imaging device 121 having a sufficient resolution to resolve the bar code for recognition by a bar code analyzer/recognition processor 111 coupled to the digital imaging device 121. The image thereby acquired for resolution of the bar code contains packaging imagery. The practice of this invention can be performed on that surrounding imagery acquired by the digital imaging device 121 without the need of separately acquiring same via a coordinated second image acquisition devise.

Figure 5:
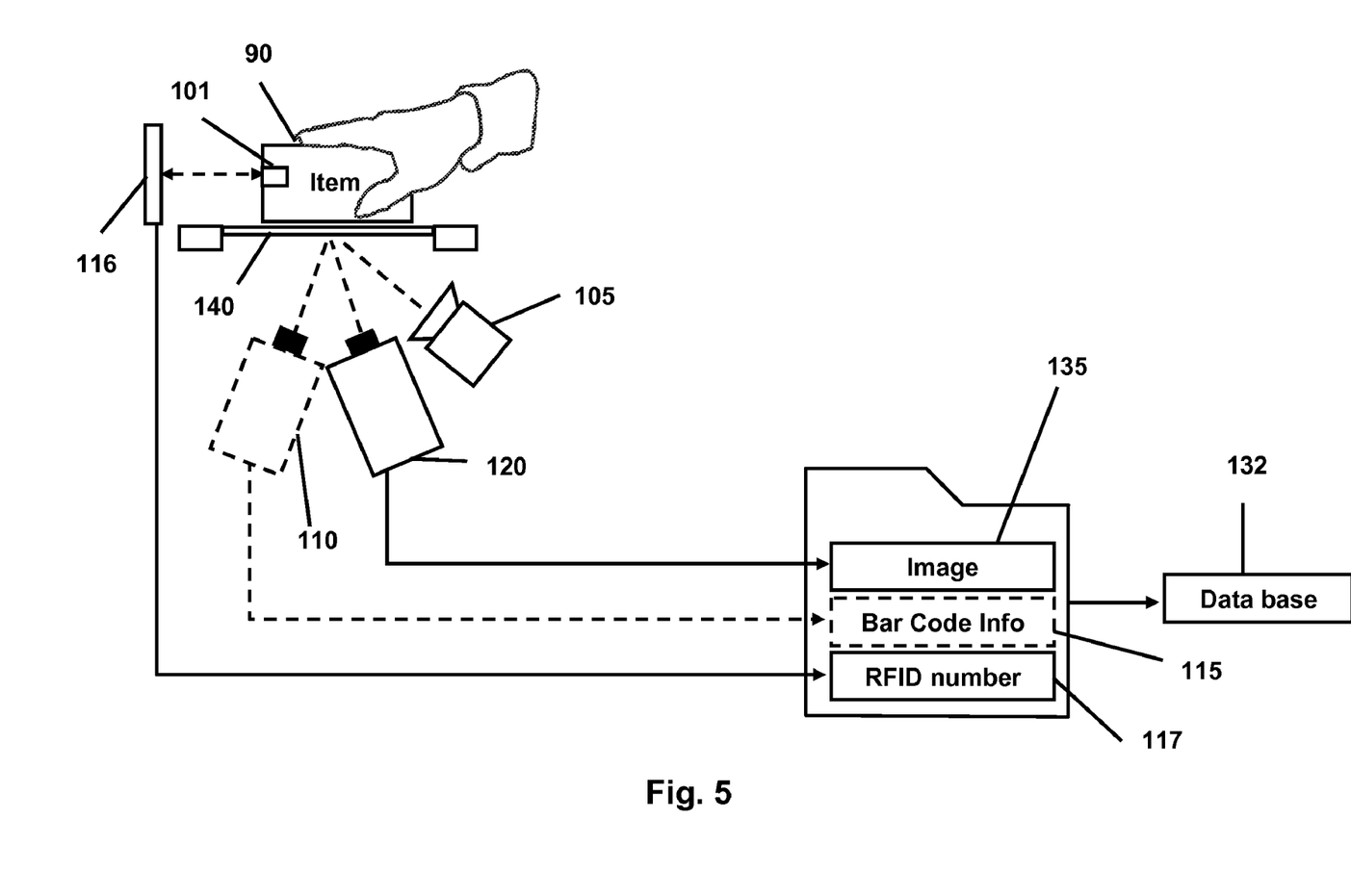
FIG. 5 illustrates an overview of an embodiment of a system for detecting a fraudulent item transaction using RFID technology.

FIG. 5 illustrates an overview of an embodiment of a system for detecting a fraudulent item transaction using RFID technology. In that embodiment, the item 90 is provided with an RFID tag 101. The RFID tag 101 may replace a printed bar code identification used for cash register checkout, or may be provided in addition to a printed bar code. In this embodiment, it is assumed that the item's RFID tag 101 has been altered to provide a false price. In another embodiment, an altered bar code is present as well.

The embodiment shown in FIG. 5 includes an RFID transceiver device 116 having an antenna located in proximity of the area the operator moves the item 90 over the transparent cover surface 140. As known in the art, the RFID transceiver device 116 polls the RFID tag 101 on the item 90 and causes the RFID tag 101 to emit its stored product information. In the illustrated embodiment, the RFID transceiver device 116 outputs an RFID number.

Below the transparent cover surface 140, the light source 105 and the digital image acquisition device 120 generating a digital image are positioned. Depending on a particular application, a bar code reader 110 providing bar code information may be positioned, as well. As the bar code reader 110 is optional, it is shown in dashed lines. The light source 105, the digital image acquisition device 120 and the bar code reader 110 operate as described above.

Similar to the above-described procedure of using bar code information 115, the RFID number 117 is used to access the data base 132 and to retrieve the item's associated digital image, which is then subjected to the described correlation procedure. Further, the RFID technology may be combined with the bar code technology, where both the RFID tag 101 and the bar code may have been altered.

It is contemplated that where RFID fraud is being detected the stored image 136 in memory 132 must include an image of practically all packaging since the operator need not hold the item in any particular orientation to the RFID transceiver 116. Advantageously, using the RFID technology does not require line-of-sight orientation. However, the image correlation may need to be extended to any aspect of the packaging and hence the image of the entire packing of each RFID tagged item may need to be pre-stored as the snippet.

Figure 6:
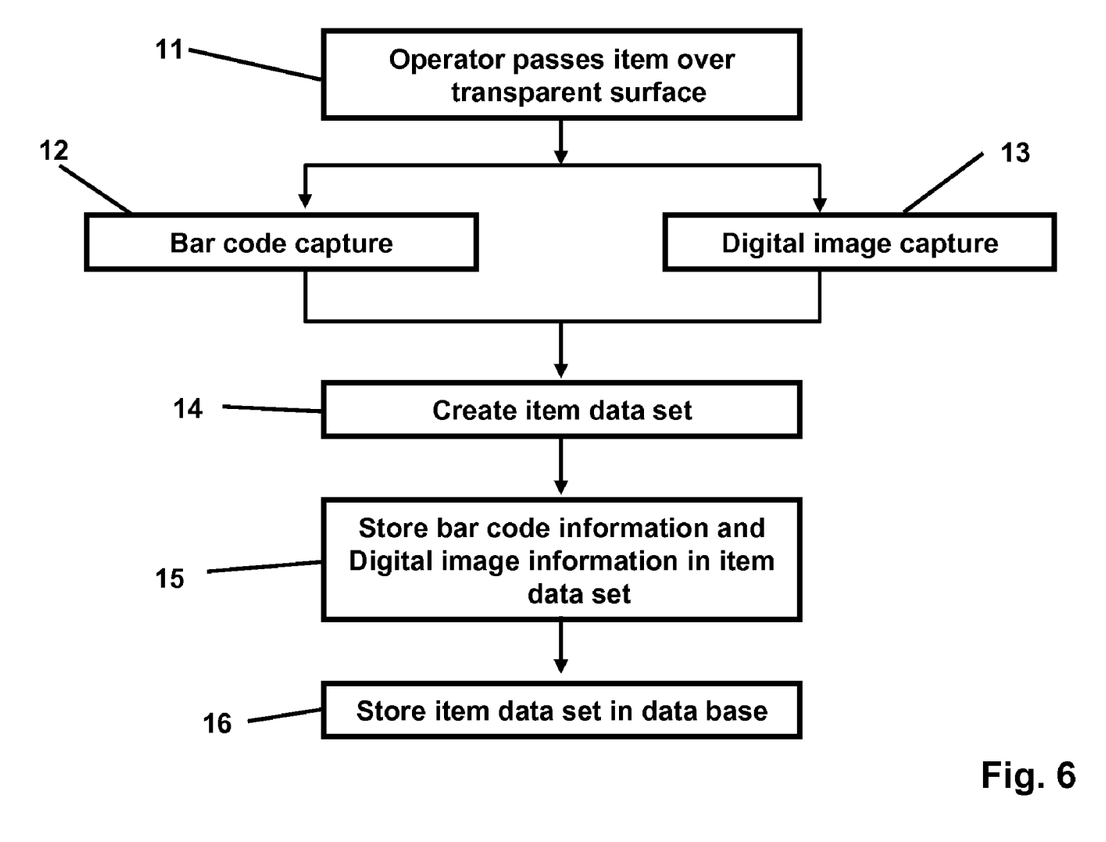
FIG. 6 is a flow diagram of one embodiment of a method of acquiring an item's bar code and a digital image snippet of the item's packaging.

FIG. 6 is a flow diagram of one embodiment of a method of acquiring an item's bar code and a digital image snippet of the item's packaging. Steps 11, 12 and 13 correspond to the steps 1, 2 and 3 shown in FIG. 2. That is, in step 11, the cashier moves an item 90 across the transparent cover surface 140, in step 12, the method captures the item's bar code to obtain the item's bar code information, and, in step 13, the method captures a digital image 135 of the item's packaging.

Proceeding to steps 14 and 15, the method uses the obtained bar code information and the captured digital image 135 to create and store a data set for the currently processed item 90. The image data set for that item 90 includes its bar code information and its associated digital image 135. In a step 16, the item data set is stored in the data base 132. An analogous process would follow for use of a hand held bar code scanner to obtain both the bar code and the image snippet for storage in database 132. In the embodiments described herein, it is not strictly required that the bar coding reading and digital imaging equipment is co-located. That is, for example, a digital camera can be positioned external to the housing of the bar code scanner, but synchronized to acquire a packaging image for the above fraud detection process.

It is contemplated that similar to the bar code reader 110, the RFID transceiver device 116 shown in FIG. 5 may be used to create an item's data set including the item's RFID number and its associated digital image.

The method illustrated in FIG. 6 can be performed by the system shown, for example, in FIG. 1. That is, the method is performed by the same system that during checkout acquires the bar code and image for detecting a fraudulent item transaction. Advantageously, enterprises such as grocery and retail stores can apply the system and method described herein even though digital images of products are not supplied together with the bar code information. Further, should a vendor introduce new packaging, a single bar code could be associated with the old and new packaging.

In the schematic illustrations of the system, e.g., FIGS. 1, 3, 4, 5, the light source 105, the bar code reader 110 and the digital acquisition device 120 are shown to be next to each other. However, the juxtaposition of these components is not intended to exclude the use of mirrors or fiber optics or other means that allow placement of the bar code reader 110 and the digital image acquisition device 120 away from direct line of sight. Instead, the juxtaposition is meant to stress that the bar code scan and digital image are coordinated so, for example, the packaging area centered around the bar code (e.g., FIG. 7), but extending to cover the adjacent unique background is image acquired, or that the image acquisition device 120 scans some other packaging surface that can be used for the correlation with the pre-stored snippet. Coordinating the image acquisition with the bar code acquisition allows obtaining an image that can be correlated with the image snippet of the packaging stored with each bar code in the data base 132. In normal operation both bar code reader 110 and the digital image acquisition devise 120 are behind the transparent glass-like surface 140.

The bar code reader 110 and the digital image acquisition device 120 are in one embodiment installed embedded in countertop fashion as in grocery store checkouts. In another embodiment, the bar code reader 110 is a handheld bar code reader coupled to the processor 100. A handheld bar code reader may be used when an item is too bulky for moving across the transparent cover surface 140.

In a further embodiment, a discrete bar code reader may be omitted. In that embodiment, all bar code reading and imaging is done by means of optical scanning. It is further contemplated that the bar code and imaging apparatus are not co-located but rather one may be outside the housing of the other.

While the invention has been particularly shown and described with reference to the preferred embodiment thereof, it will be understood by those skilled in the art that the foregoing and other changes in form and detail may be made therein without departing from the spirit and scope of the invention.

What is claimed is:

1. A method of detecting a fraudulent transaction of an item having an item-identifying indicium, wherein the item-identifying indicium includes at least one of a bar code, an RFID tag, a magnetic stripe, a pattern code, a two-dimensional bar code and a non-visible identification sign, the method comprising:
   processing the indicium to obtain item-identifying information stored in a data base, the item-identifying information being associated in the data base with a stored digital image of a surface area of the item;
   capturing a digital image of a predetermined surface area of an item using a digital image acquisition device;
   transferring the captured digital image from the digital image acquisition device to a processor;
   using the item-identifying information to retrieve the stored digital image of the surface area of the item associated with the item-identifying information;
   transferring the stored digital image from the data base to the processor; and
   subjecting the captured digital image and the stored digital image in the processor to an orientation invariant digital pattern match algorithm that computes a correlation value between the captured digital image and the stored digital image to determine if the captured digital image corresponds to the stored digital image as a function of a predetermined correlation threshold value.

2. The method of claim 1, further comprising generating a notification if the captured digital image does not correspond to the stored digital image, wherein the notification is indicative of a fraudulent item.

3. The method of claim 2, wherein the notification includes at least one of audio, visual and vibration signals.

4. The method of claim 3, wherein the notification includes a presentation of product identification information relating to the fraudulent item.

5. The method of claim 1, wherein using the item-identifying information to retrieve a stored digital image includes accessing a data base that includes for each item an item data set including item-identifying information and an associated digital image of the item.

6. The method of claim 1, wherein the digital image of the surface area is captured of one of a packaging surrounding an immediate area of a printed indicium, a selected or random area away from the printed indicium, and an entire packaging.

7. The method of claim 1, wherein the correlation algorithm is a Fourier-Mellin class of algorithm.

8. The method of claim 7, wherein the correlation algorithm compares the determined correlation value with the correlation threshold value, and wherein a fraudulent item transaction is detected if the determined correlation value is lower than the correlation threshold value.

9. The method of claim 1, where correlation is achieved via at least one of color patterns, character string optical character recognition and spatial relationships.

10. A system for detecting a fraudulent transaction of an item having an item-identifying indicium, wherein the item-identifying indicium includes at least one of a bar code, an RFID tag, a magnetic stripe, a pattern code, a two-dimensional bar code and a non-visible identification sign, the system comprising:
   a memory device containing a data base configured to store item-identifying information associated with a stored digital image of a surface area of the item;
   a reader configured to process the indicium to obtain item-identifying information stored in the data base;

an imaging device configured to capture a digital image of a predetermined surface area of an item; and a processor coupled to the reader, the imaging device and the memory device, wherein the processor is configured to use the item-identifying information to retrieve the stored digital image of the surface area of the item associated with the item-identifying information from the data base of the memory device, and to subject the captured digital image and the stored digital image to an orientation invariant digital pattern match algorithm that computes a correlation value between the captured digital image and the stored digital image to determine if the captured digital image corresponds to the stored digital image as a function of a predetermined correlation threshold value.

11. The system of claim 10, wherein the processor is further configured to generate a notification if the captured digital image does not correspond to the stored digital image, wherein the notification is indicative of a fraudulent item.

12. The system of claim 11, wherein the processor is coupled to means for generating at least one of audio, visual and vibration notification signals.

13. The system of claim 11, wherein the notification includes a presentation of product identification information relating to the fraudulent item.

14. The system of claim 10, wherein the data base includes for each item an item data set including item-identifying information and an associated digital image of the item.

15. The system of claim 10, wherein the imaging device is configured to capture a digital image of one of a packaging surrounding an immediate area of a printed indicium, a selected or random area away from the printed indicium, and an entire packaging.

16. The system of claim 10, wherein the processor is configured to perform a Fourier-Mellin class of correlation algorithm.

17. The system of claim 10, wherein the correlation algorithm compares the determined correlation value with the correlation threshold value, and wherein a fraudulent item is detected if the determined correlation value is lower than the correlation threshold value.

* * * * *